No. 691,535. Patented Jan. 21, 1902.
E. EHLERMANN.
PROCESS OF MANUFACTURING AUTOTYPE PLATES.
(Application filed Oct. 27, 1900.)
(No Model.)

Witnesses
Inventor
Erich Ehlermann
Attorneys

UNITED STATES PATENT OFFICE.

ERICH EHLERMANN, OF DRESDEN-ALTSTADT, GERMANY.

PROCESS OF MANUFACTURING AUTOTYPE-PLATES.

SPECIFICATION forming part of Letters Patent No. 691,535, dated January 21, 1902.

Application filed October 27, 1900. Serial No. 34,665. (No specimens.)

*To all whom it may concern:*

Be it known that I, ERICH EHLERMANN, a manufacturer, and a subject of the King of Saxony, residing at 9 Kaitzerstrasse, in the city of Dresden-Altstadt, in the Kingdom of Saxony, German Empire, have invented a certain new and useful Process for the Manufacture of Autotype-Plates, of which the following is a specification.

This invention has reference to a process for the manufacture of autotype-plates which when compared with the processes heretofore in use for the manufacture of such plates by photographic means is especially distinguished by devising novel means for breaking up the genuine half-shades produced by the photographic process into a system of dots and lines, such as constitute the shades required for the etching process.

By means of my new process about to be described I am enabled, first, to so arrange the reticulated plate used in connection with the autotype process that some parts of the sensitive plate upon which the breaking up of the half-shades is effected are not acted upon by the picture of such reticulated plate, so as to enable me to obtain greater contrasts of shades than it has been possible before my invention, and, second, by my invention it is possible to produce upon the sensitive plate a grain of different fineness with one and the same reticulated plate.

My invention is illustrated by the accompanying drawings, in which—

Figure 2:
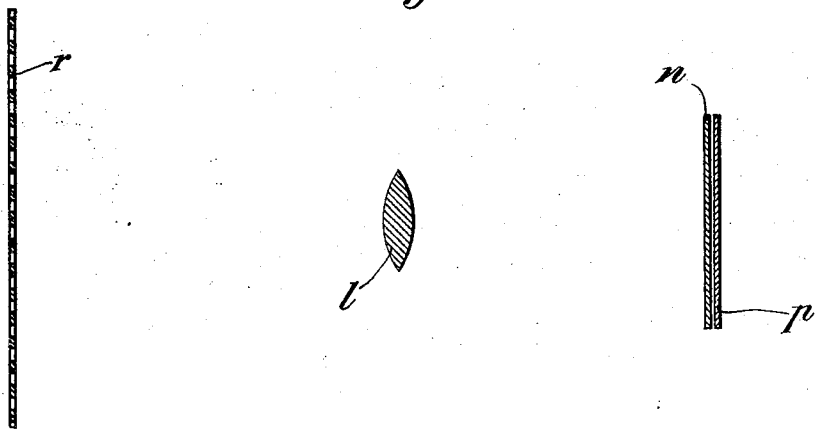
Figure 1:
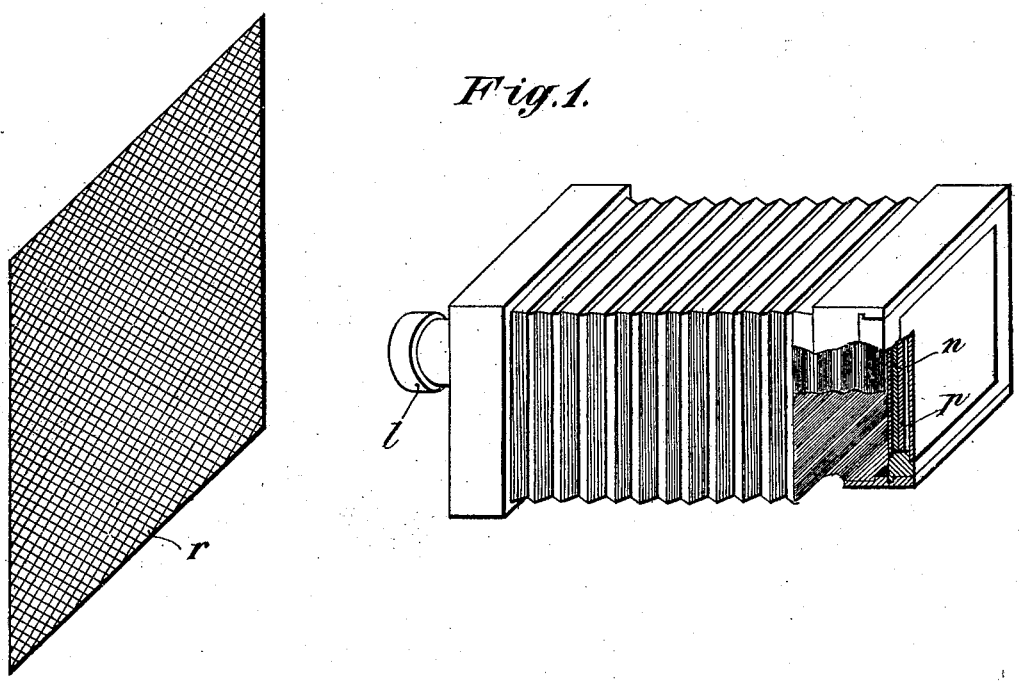

Figure 1 shows a photographic camera in perspective view, including the screen-plate; and Fig. 2 is a diagram illustrative of the relative positions of the reticulated plate and of the photographic picture.

In the manufacture of autotype-plates as heretofore practiced it was usual to proceed as follows: First, the object from which the autotype was to be taken was copied by photography, a negative picture of the same being thereby produced; second, from this negative picture a diapositive was prepared; third, this diapositive was copied a second time by placing a reticulated plate, as before described, in the photographic camera in front of the sensitive plate, so as to take the picture through the transparent reticulated plate, the half-shades, properly speaking, being broken up into dots and lines, and, fourth, the picture thus obtained was transferred upon a metal or a stone plate, and the latter was then etched. The process carried out in this manner shows the following disadvantages: First, it is difficult and very expensive to manufacture reticulated plates of the above description of sufficient fineness, especially for larger size pictures; second, it is difficult to adjust the reticulated plate so as to be exactly parallel to the sensitive plate; third, it is difficult to find the right distance of the sensitive plate and the reticulated plate for one and the same shutter; fourth, it is impossible to have the brightest light brought out in perfectly-white color in the print, as the prints are not distinct, and, fifth, if the lines of the reticulated transparent plate are made finer all the parts will become more exact, the details being brought out with greater sharpness, but the picture as a whole will become less impressive, the lines being too sharp and distinct and of the same sharpness throughout the whole picture, which thereby failed to represent the proper proportion and distribution of light and shades.

In the process forming the subject of this application I entirely discard the old way of making a new copy through the reticulated transparent plate, as has been done heretofore; but, on the contrary, the reticulated plate is copied itself, and it is copied through the original negative picture, whereby a new plate is obtained, upon which the half-shades of the original negative are all broken up into dots and lines.

In carrying out my invention the negative picture $n$ originally produced is placed upon the sensitive plate $p$, of glass, metal, or stone, both plates being preferably put face to face. In this condition both plates are then introduced into an ordinary photographic-plate holder, which must only be large enough to inclose both plates and still keep them pressed tightly upon one another during exposure, but may be of the ordinary construction. The plate-holder $i$ is next inserted into a photographic camera, in front of which I place the reticulated plate or screen $r$, above mentioned, and upon which the reticulations may be arranged in various ways, so as to either break up the half-shades into a system of dots or a system of lines, the relative arrangement of the reticulations on the screen, the manufacture of which forms no part of this invention, being governed by the requirements of the particular case. Exposure is then made in the usual manner, and a picture of both the original photographic picture and of the reticulated plate is produced upon the sentitive plate $p$.

If in the process a metal or stone plate rendered sensitive has been used for making the copy, the etching may be made directly from this plate. In the case of a glass plate, however, having been employed reprinting upon a metal or stone plate is necessary, which is done by any of the well-known methods of copying, taking into consideration that it becomes nearly always necessary to reverse the picture.

The advantages of the new process may be summed up as follows: The inconveniences of the processes heretofore in use, to which reference has been made above, are entirely obviated by my process. The lines or dots upon the reticulated plate, which is placed in front of the camera, may be placed at any distance apart and may be brought out more or less boldly, any desired grain being produced upon the printing-plate by simply reducing the reticulated plate sufficiently by means of the photographic process, and thereby reducing the distance between the lines of the reticulated plate.

Another important advantage of my invention is presented by the possibility of employing one and the same reticulated plate for producing a grain of different fineness upon the plate, thus enabling me to entirely dispense with the use of the expensive reticulated plates made of glass. Then I avoid the difficulty of adjusting the transparent reticulated plate in an exactly parallel plane and at the right distance to the sensitive plate. Furthermore, by varying the time of exposure more or less of the picture of the reticulated plate will be made to appear through the half-shades of the negative. For the brightest light I am enabled to entirely cut out the picture of the said reticulated plate—that is to say, in the densest parts of the negative plate—so as to bring out the contrasts in the plates. I may also mention that I may increase the fineness of the grain upon the printing-plate to any desired extent, inasmuch as in consequence of the cutting out of the picture of the reticulated plate by the negative the lighted parts will remain bright at any rate.

Besides these important technical advantages the new process is also a great improvement from an economical point of view. The great expense for glass-made reticulated plates and for plate-holders for placing them before the sensitive plate is avoided. Then there is a great saving of labor and in material used in carrying out the process. Of the four different steps above mentioned, which heretofore were thought indispensable for the autotype process, in most cases the second and the third steps are avoided, and in all cases I entirely eliminate the second step of the old process.

By my process I can produce reticulated, dotted, or hatched copies either upon metal or stone plates which may be submitted directly to the etching process, or in case of glass plates being used the plate for the etching process may be produced by any of the well-known reprinting processes.

What I claim, and desire to secure by Letters Patent of the United States, is—

The process for manufacturing autotype-plates which consists in first preparing a transparent photographic picture of the object the reproduction of which is to be effected, placing said picture upon a suitable sensitive plate and preferably face to face with the same, then inserting both plates in a photographic camera, and placing a suitably-reticulated plate in front of the lens of said camera and finally exposing said suitably-reticulated plate to light and photographing the same upon the sensitive plate within the camera and through the said lens and through the previously-taken photographic picture.

In witness whereof I have hereunto signed my name in the presence of two subscribing witnesses.

ERICH EHLERMANN.

Witnesses:
MARGARETE SCHICK,
PAUL ARRAS.